United States Patent
Kokemohr et al.

(10) Patent No.: US 10,523,916 B2
(45) Date of Patent: *Dec. 31, 2019

(54) MODIFYING IMAGES WITH SIMULATED LIGHT SOURCES

(71) Applicant: Google LLC, Mountain View, CA (US)

(72) Inventors: Nils Kokemohr, Hamburg (DE); Daniel Fenner, Hamburg (DE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,727

(22) Filed: May 9, 2018

(65) Prior Publication Data
US 2018/0262671 A1 Sep. 13, 2018

Related U.S. Application Data

(63) Continuation of application No. 14/469,540, filed on Aug. 26, 2014, now Pat. No. 9,979,894.

(60) Provisional application No. 62/018,367, filed on Jun. 27, 2014.

(51) Int. Cl.
*H04N 13/207* (2018.01)

(52) U.S. Cl.
CPC ................. *H04N 13/207* (2018.05)

(58) Field of Classification Search
None
See application file for complete search history.

(56) References Cited

U.S. PATENT DOCUMENTS

| | | | |
|---|---|---|---|
| 4,737,921 A | 4/1988 | Goldwasser et al. | |
| 7,764,286 B1 | 7/2010 | Kumar | |
| 8,363,157 B1 | 1/2013 | Han | |
| 9,979,894 B1 * | 5/2018 | Kokemohr | H04N 13/207 |
| 2002/0064299 A1 | 5/2002 | Shibuya | |
| 2012/0002082 A1 | 1/2012 | Johnson et al. | |
| 2012/0120071 A1 | 5/2012 | Thorn | |
| 2013/0069977 A1 | 3/2013 | Yuyama | |
| 2013/0198668 A1 | 8/2013 | Matas et al. | |
| 2013/0229413 A1 | 9/2013 | Geggie et al. | |
| 2014/0028678 A1 | 1/2014 | Chmielewski et al. | |
| 2014/0085398 A1 | 3/2014 | Tian et al. | |
| 2015/0350560 A1 | 12/2015 | Zhou et al. | |

OTHER PUBLICATIONS

Lazunov, "3D Modeling in Adobe Illustrator", Dsignmodo, http://designmodo.com/3d-modeling/illustrator/, Mar. 17, 2013, 36 pages.
Niedenthal, et al., "Shadowplay: Simulated Illumination in Game Worlds", Proceedings of DiGRA 2005 Conference: Changing Views—Worlds in Play, 2005, 9 pages.

(Continued)

*Primary Examiner* — James M Anderson, II
(74) *Attorney, Agent, or Firm* — IP Spring

(57) ABSTRACT

Implementations relate to modifying images with simulated light sources. In some implementations, a method includes receiving input indicating a location on a 2-D displayed image at which to position a light source element, and adjusting pixel values of the image to cause an illumination effect in the image based on the position of the light source element and based on a direction of illumination of the simulated light source with respect to one or more surfaces depicted in the image.

20 Claims, 7 Drawing Sheets

(56) References Cited

OTHER PUBLICATIONS

Philpott, "Adding Atmosphere with Vignettes", Moving Colors, the Adobe SpeedGrade Blog, http://blogs.adobe.com/movingcolors/2012/08/29/adding-atmosphere-with-vignettes/, Aug. 29, 2012, 4 pages.
USPTO, Final Office Action for U.S. Appl. No. 14/469,540, dated Nov. 15, 2017, 15 pages.
USPTO, First Action Interview, Office Action Summary for U.S. Appl. No. 14/469,540, dated Jun. 2, 2017, 16 pages.
USPTO, First Action Interview, Pre-Interview Communication for U.S. Appl. No. 14/469,540, dated Oct. 21, 2016, 6 pages.
USPTO, Notice of Allowance for U.S. Appl. No. 14/469,540, dated Jan. 22, 2018, 8 pages.
Willis, "Mastering Control Points", Digital Photo Magazine, Werner Publishing Corp., Aug. 16, 2011, 6 pages.

* cited by examiner

MODIFYING IMAGES WITH SIMULATED LIGHT SOURCES

CROSS-REFERENCE TO RELATED APPLICATIONS

This application is a continuation of and claims priority to U.S. patent application Ser. No. 14/469,540, filed Aug. 26, 2014 and titled MODIFYING IMAGES WITH SIMULATED LIGHT SOURCES, which claims priority to U.S. Provisional Application No. 62/018,367, filed Jun. 27, 2014 and titled MODIFYING IMAGES WITH SIMULATED LIGHT SOURCES, both of which are incorporated herein by reference in their entirety.

BACKGROUND

The popularity and convenience of digital cameras as well as the widespread of use of Internet communications have caused digital images to become ubiquitous. For example, digital photographs are commonly captured by camera devices and cameras included in other portable devices such as phones, tablet computers, wearable devices, etc. Photos are also often posted to various Internet sites, such as web pages, social networking services, etc. for users and others to view. To change such images, a user commonly edits the images by opening an image in an editor program and manually selecting and adjusting various characteristics of pixels of the image, such as color, brightness, contrast, saturation, clarity or blur, etc., using tools of the editing program.

SUMMARY

Implementations relate to modifying images with simulated light sources. In some implementations, a method includes receiving input indicating a location on a 2-D displayed image at which to position a light source element, and adjusting pixel values of the image to cause an illumination effect in the image based on the position of the light source element and based on a direction of illumination of the simulated light source with respect to one or more surfaces depicted in the image.

Various implementations and examples of the method are described. For example, the image can be obtained without associated data or metadata describing 3-D features of the scene depicted by the image, such that the one or more surfaces in the image are estimated by the method based on analysis of the image pixels. The adjusting of pixel values can be performed with respect to the one or more surfaces in response to determining that the light source element provides illumination in the image more strongly on one side of an approximately vertical axis of the image than the other side. Adjusting pixel values can include determining one or more surface angles of the depicted surfaces in the image by estimating local normal vectors for the depicted surfaces. For example, estimating local normal vectors can be based on estimated image depth information for the surfaces. In additional examples, estimating local normal vectors can be for surfaces of human faces based on at least one known standard map of face surfaces that has been adapted to the faces in the image. Estimating local normal vectors can include determining a derivative of brightness in a particular direction in the image for each of the depicted surfaces.

Adjusting the pixel values can include determining normal vectors for one or more areas of the image outside of one or more faces depicted in the image based on normal vectors of the one or more faces. In another example, adjusting pixel values can include determining image depth from the camera to one or more objects depicted in the image based on a brightness of one or more surfaces of the one or more objects caused by a flash in effect when the image was captured. Adjusting pixel values can include determining an estimated 3-D model of the scene depicted in the image, where the 3-D model is refined based on locations of one or more faces compared to locations of non-face objects in the image, and/or based on different sizes of a plurality of different faces depicted in the image.

In some implementations, the method can further include globally dimming the brightness of the entire image before causing the illumination effect, and/or further include removing gamma correction before adjusting the pixel values and reapplying the gamma correction after adjusting the pixel values. In various example implementations, the light source element can include an indication of a center of an illuminated area of the image which is illuminated by the simulated light source associated with the light source element, a control aligned with the associated simulated light source and receptive to selection and movement by the user to change a direction or orientation of the simulated light source associated with the light source element, and/or one or more control points associated with the illuminated area and receptive to user adjustment to adjust the size or shape of the illuminated area. In some implementations, the caused illumination effect can be selected from multiple different available types of illumination effects, including a basic illumination effect that does not take into account content of the image, and/or a refined illumination effect that takes into account content of the image. For example, the method can cause a display of one or more preview images to the user that provide one or more previews of the basic illumination effect and the refined illumination effect, and the method can provide one or more options to the user to cause one or more of these different types of illumination effects to be applied in the image.

A method includes, in some implementations, receiving input from the user indicating a location on a two-dimensional (2-D) displayed image at which to position a light source element, and adjusting pixel values of the image to cause an illumination effect in the image based on the position of the light source element and based on one or more settings of the light source element. The settings include a direction setting for indicating a direction of a simulated light source associated with the light source element, and a brightness setting for indicating a brightness of the simulated light source. The settings can also include a temperature setting for indicating a color temperature of the simulated light source. Some implementations can further include adjusting the illumination effect based on the direction of the simulated light source with respect to one or more estimated in-image surface angles.

In some implementations, a system can include a storage device and at least one processor accessing the storage device and operative to perform operations. The operations can include operations similar to features and implementations described above. The operations can include receiving input indicating a location on a 2-D displayed image at which to position a light source element, and adjusting pixel values of the image to cause an illumination effect in the image based on the position of the light source element and based on a direction of illumination of the simulated light source with respect to one or more surfaces depicted in the image. Various implementations are described. For example, the operation of adjusting pixel values can be performed with respect to the one or more surfaces in response to determining that the light source element provides illumination in the image more strongly on one side of an approximately vertical axis of the image than the other side. The operation of adjusting pixel values can include determining one or more surface angles of the depicted surfaces in the image by estimating local normal vectors for the depicted surfaces. Some implementations can provide a computer program product including a computer readable medium providing program instructions implemented by a computer and performing steps or operations similar to the features of the method described above.

DETAILED DESCRIPTION

Figure 1:
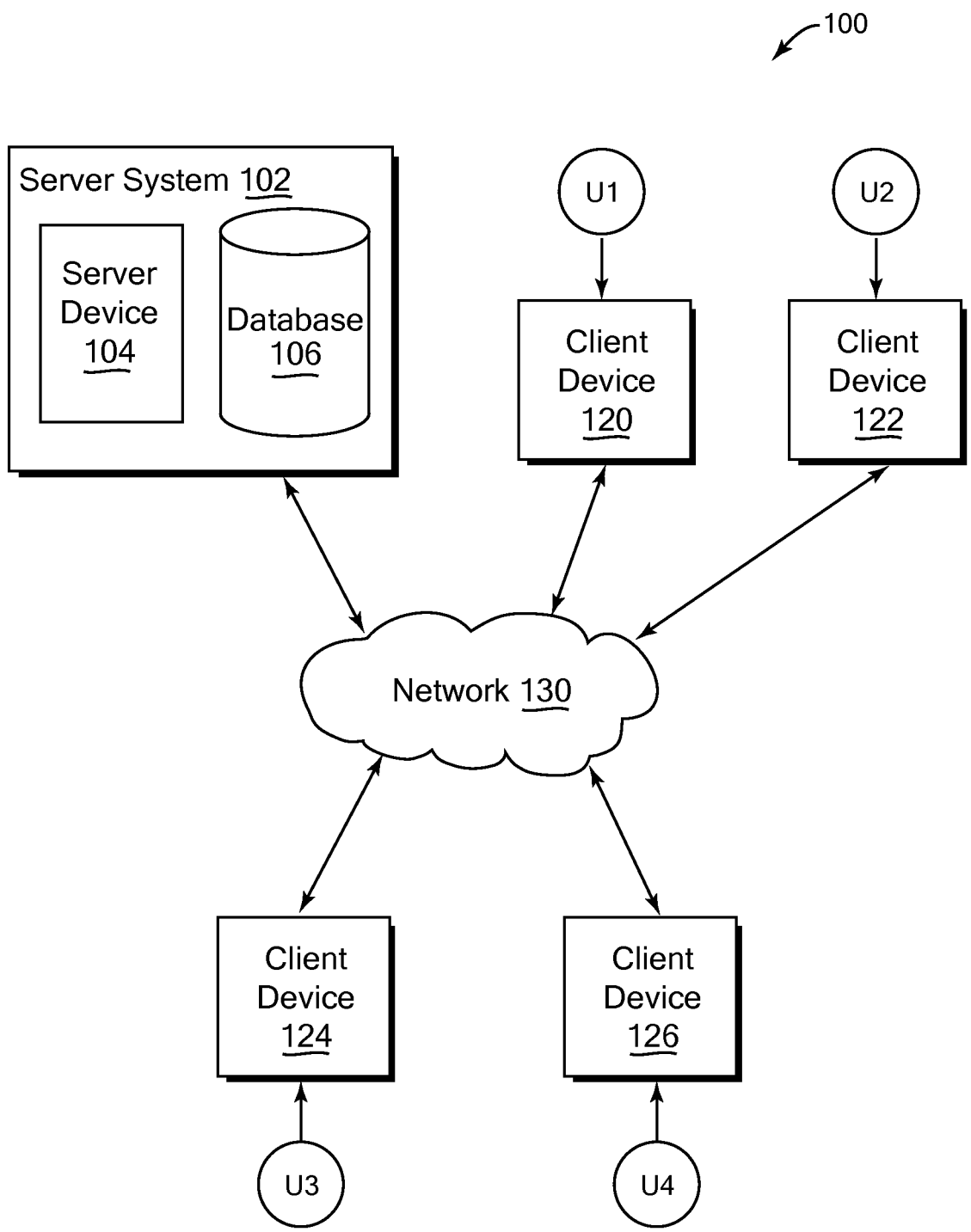
FIG. 1 is a block diagram of an example network environment which may be used for one or more implementations described herein.

One or more implementations described herein relate to modifying images with simulated light sources. For example, a light source element can be added by a user to a desired location in an image, and the user can configure parameters of the light source element such as an illumination direction, brightness, color temperature, and/or illuminated image area from a simulated light source associated with the element. Illumination from the light source is added to the image based on the light source element. In some implementations, more realistic illumination in the image can be obtained based on estimated orientations of surfaces in the image that are receiving the simulated light. Surface angles can be estimated, for example, based on estimating normal vectors for different surfaces in the image for faces and for non-face objects using one or more heuristics that analyze content of the image.

For example, if the system determines that the light source element provides illumination in the image more strongly on one side of a vertical axis than the other side, the system can adjust and refine the illumination to make it appear more realistic based on the light source angle and estimated surface angles of surfaces in the image that are receiving the light. Surface angles can be estimated based on estimating normal vectors for different surfaces in the image. For example, surface angles of faces in the image can be estimated based on known typical facial geometry adapted to the particular landmarks of each face. Outside of faces, the system can estimate normal vectors using a heuristic based on change of brightness in pixels in a particular direction. In some cases, the heuristic can be refined with additional heuristics such as comparing non-face surfaces to known surfaces of a face, and/or estimating a 3D model of the scene depicted in the image based on flash brightness, face attributes such as locations of faces compared to non-face objects, sizes of different faces indicating depth in the image, etc.

Described features can allow a user to selectively add illumination from simulated light sources to desired areas in an image, e.g., using an editing program. For example, the light sources can be configured with a variety of parameters using simple and intuitive interface elements and tools, allowing a user increased control over how the illumination appears. Furthermore, features provide analysis of image content to cause illumination to appear realistically based on estimated surfaces appearing in the image. These surfaces can be estimated without requiring metadata describing 3-D features of the scene in the image, such as depth maps from camera sensors, light ray information of the scene obtained from light field cameras, 3-D models or maps of the scene depicted in an image, etc. Or, features herein allow the surfaces to be estimated with rough, imprecise, or estimated such metadata. Thus, a technical effect of editing images as disclosed herein include a reduction in duration of editing images, thus saving a user time, energy, and resources for achieving edits to images. For example, using described features, a user can apply a complex lighting effect on any image that would require many more edit operations in previous editing programs. Another technical effect is a higher quality of edits to images resulting from intuitive and powerful control over attributes of added light sources, as well as more realistic appearance of illumination based on image content.

An "image" as referred to herein can be a still image or standalone image, or can be an image in a series of images, e.g., a frame in a video sequence of frames. For example, implementations described herein can be used with a single image or with a series or video sequence of images. Adding illumination to an image based on one or more light source elements as described herein can be considered an "edit operation" in some implementations. An edit operation can be an image processing operation or technique, e.g., modifying color, size, orientation, compression (which may not alter color), visible area (e.g., via cropping or other operation), or other image characteristics. In some examples, an edit operation is an edit or modification made to one or more pixels of an image, causing a visual change in the image. An "object" described herein as being depicted in an image can be any kind of object or feature (or portion thereof), such as a person, face, animal, article or item, landscape or terrain feature, structure, etc. Such objects can have one or more surfaces which may be depicted in the image and can be used in some features described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, e.g., a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, designate users for one or more social groups, upload and post shared content including text, images, video sequences, audio sequences or recordings, or other types of content for access by designated sets of users of the social network service, and/or perform other socially-related functions.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen. In some implementations, application programs running on a server system can communicate with a client device to receive user input at the client device and to output data such as visual data, audio data, etc. at the client device.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
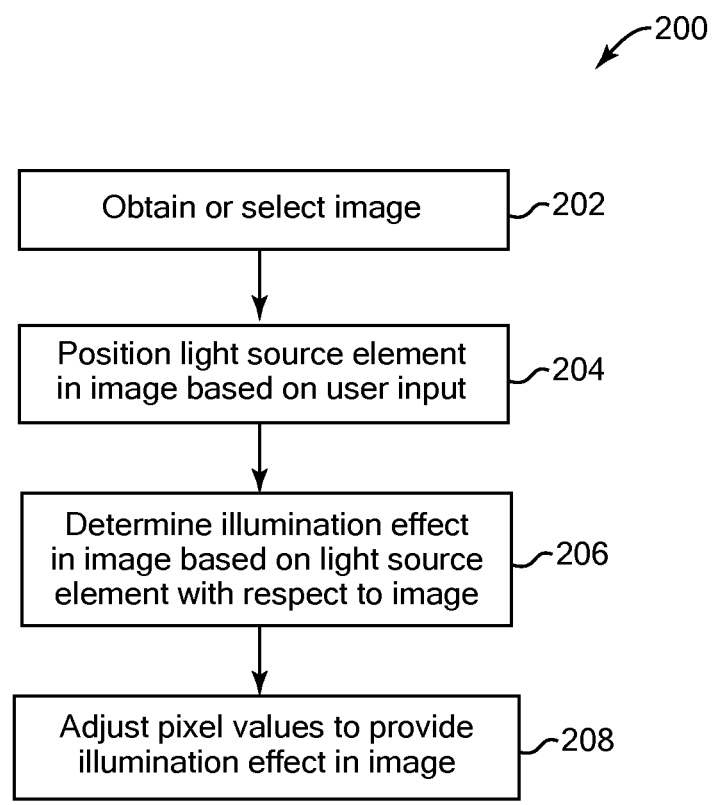
FIG. 2 is a flow diagram illustrating an example method for modifying images with simulated light sources, according to some implementations.

FIG. 2 is a flow diagram illustrating one example of a method 200 for modifying images with simulated light sources. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more digital processors or processing circuitry ("processors"), and one or more storage devices such as a database 106 or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be initiated based on one or more particular events or conditions such as a user opening an application, e.g., an image editing application, receiving one or more images that have been newly uploaded to or accessible by the system, etc. In some implementations, such conditions can be specified by a user in custom preferences of the user. In some implementations, the method 200 or portions thereof can be performed with guidance by the user. For example, a user can designate a set of multiple input images to be input and processed by method 200. In one example, method 200 (or portions thereof) can be performed on a camera, cell phone, or other client device that has captured one or more images. In addition or alternatively, a client device can send images to a server over a network, and the server can process the images using method 200, or the server can receive images from a different source (a different server, etc.).

In block 202 of method 200, the method obtains or selects an image for processing. The image can be a digital image composed of multiple pixels, for example, and can be stored on one or more storage devices of the system performing method 200 or otherwise accessible to the system, such as a connected storage device, e.g., a local storage device or storage device connected over a network. For example, the image can be a photo captured by a camera, an image frame extracted from a captured video stream or other video data, or an image derived from a different source. In some implementations, a user can provide or designate one or more input images to process. In other implementations, the image can be automatically selected by the method, e.g., as an image from an album or other collection of multiple images, such as an album provided in an account of a user of a social networking system. In some examples, the system can determine which image to obtain based on evaluating one or more characteristics of accessible images, such as the color and/or brightness distributions of images, timestamps and other metadata of images, and/or identified and recognized content depicted in the images, such as persons, faces, or other objects.

In some implementations, the image can be a two-dimensional (2-D) image that is not associated with accompanying 3-D information that three-dimensionally describes the scene which is depicted in the image. For example, the image can be a 2-D image without any metadata describing image depths of objects depicted in the image (e.g., distances from camera to objects), nor describing any other dimensions or relationships between objects captured in the scene. In some implementations, the image can be an image not viewable as a 3-D image (e.g., with stereoscopic glasses, etc.). In other implementations, the image can be a 2-D image with metadata describing depth information and/or other information describing the 3-D layout of the scene depicted in the 2-D image. The image can be displayed on a display device of the system in some implementations of method 200. For example, the image can be displayed by an image editing program or other program running on the system that can offer one or more features described herein.

In block 204, the method positions one or more light source elements in the image based on user input. In some examples, a user can direct the placement of a light source element using a tool in a user interface of an image editing program, as described in greater detail below with reference to FIG. 3. A light source element provides a simulated light source to add an illumination effect to the image, as described below.

In block 206, the method determines an illumination effect in the image based on the light source element(s) with respect to the image. Each light source element acts as a simulated light source to provide associated illumination in the scene of the image as if the simulated light source were present at the time of image capture. In some examples, the method can use the location in the image and other parameters or settings of the light source element to determine the location, size, brightness, warmth, and/or other attributes of the illumination effect in the image. In some implementations, the method can also refine the illumination effect to make it appear more realistic or natural. For example, the method can examine the image to estimate where surfaces are located in the image that may reflect light and affect the illumination effect(s). Some examples of such implementations are described below with reference to FIG. 3.

In block 208, the method adjusts pixel values in the image to provide the illumination effect(s) in the image. For example, the pixel values can be adjusted based on the illumination effect determined in block 206. This causes the image to appear with the added illumination effect provided by the light source element of the user interface of the image editing program. The resulting image with the illumination effect can also be displayed in some implementations, e.g., in a user interface of an image editing program being used and viewed by the user. In some implementations, the method 200 can be performed additional times for additional simulated light sources, light source elements and corresponding illumination effects that are added to the image.

Thus, the method allows a simulated light source to be added to an image to apply a visible and displayed illumination effect in the image. A convincing illumination effect can be added to a two-dimensional (2-D) image in which a three-dimensional (3-D) model is not available, allowing a user to have more editing options when performing edit operations on images. Furthermore, the user is not required to perform complex tasks to add the illumination effect from a simulated light source. Therefore, less effort and resources are needed for a user to effectively edit an image.

Figure 3:
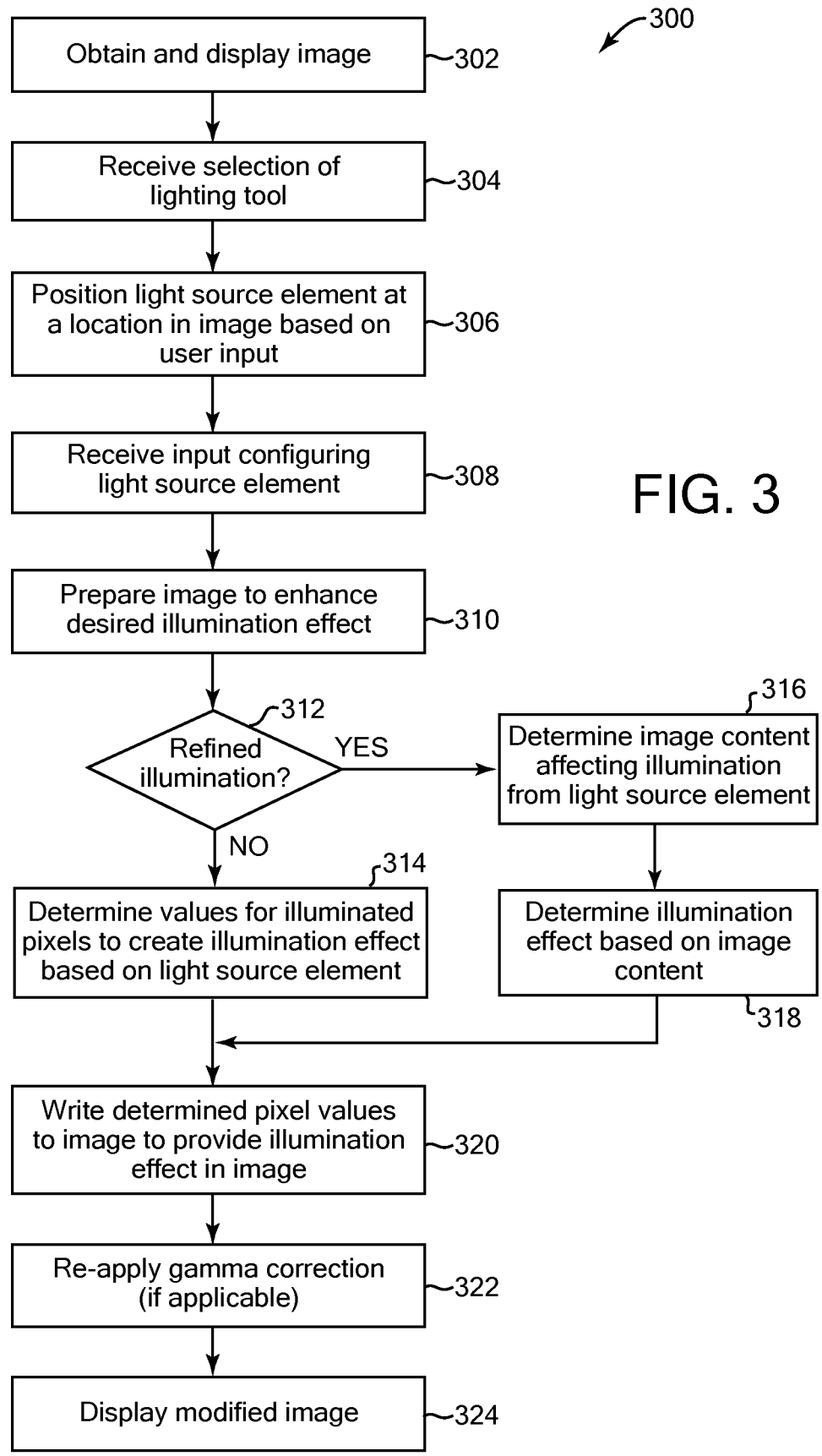
FIG. 3 is a flow diagram illustrating another example method for modifying images with simulated light sources, according to some implementations.

FIG. 3 is a flow diagram illustrating another example of a method 300 for modifying images with simulated light sources, according to some implementations. Method 300 can be similarly implemented by a system such as a server and/or client device, and can be similarly initiated and performed, as described above for method 200.

In block 302, the method obtains an image similarly as described above for block 202 of FIG. 2 and displays the image. The image can be displayed on a display device of the implementing system, e.g., by an image editing application program running on the system, where the editing program includes a user interface that presents editing options and settings for the user. For example, the interface can include a graphical user interface, command line interface, etc. Some examples of user interfaces using one or more features herein are described below with reference to FIGS. 5-6.

In block 304, the method receives a selection of a lighting tool. For example, the input can be received from a user in the user interface of the image editing program, e.g., a selection by the user of an icon, command, menu item, graphical button, or other control of the interface that selects the lighting tool. In various implementations, the input from the user can be provided as touch input on a touchscreen of a device used by the user, or can be input provided by the user using a different device, such as a press or activation of a physical button on a hardware device (mouse, trackball device, trackpad, etc.) while a user-controlled tool cursor is positioned over a desired control displayed in the user interface. In some implementations, the user input can take other forms, such as a voice or sound command input to a microphone of the system to select a function of the image editing program (e.g., recognized via voice recognition or sound command recognition), a visual command input to a camera or other visual sensor of the system and recognized by the system as a command (e.g., an eye-motion command, finger or hand gesture, etc.), or a motion command detected by motion sensors such as accelerometers and/or gyroscopes (e.g., moving or orienting a portable device in a predetermined manner to be recognized as a command by the system).

In some implementations, the lighting tool, when selected, can allow the user to add one or more light source elements to the image according to features described herein. For example, the selection of the lighting tool can cause the editing program to go into a "lighting mode" allowing the user to place and adjust the light source elements. Each light source element can be associated with its own user-specified and/or default parameters and settings, as described below. The user can select a displayed control or provide a command to exit the lighting mode to use other functions of the editing program.

In block 306, the method positions a light source element at the location in the image based on user input. For example, the user can be using the lighting tool described above to select a desired pixel or location in the image at which the light source element is placed. In some examples, the user can select desired location by pointing (e.g., tapping) or clicking on a particular pixel or location within an image. In some implementations, the light source element can have a distinctive shape or color to indicate its function, such as a small cylinder, cube, circle or ring of a particular color.

In block 308, the method receives user input configuring the light source element placed in block 306. Block 308 can also or alternatively be performed at any time during the method 300. Various implementations can allow the user to adjust a variety of parameters and/or settings associated with a light source element and the simulated light source provided by the light source element. For example, the user can configure a brightness of the light provided by the simulated light source and a direction of the light emitted by that light source. The user can also select or adjust a color of the light emitted by the light source. In some implementations, the user can adjust a color temperature (e.g., a warmth) of the light emitted by the source. Some implementations can allow the user to adjust the size and/or shape of the area of the image illuminated by the simulated light source of the light source element. For example, the interface can provide various predefined shapes for the area affected by the limitation, such as ellipses or circles, which can be modified by the user. In some implementations, the user can select whether the source of light provides a "soft" light or a "hard" light, where a soft light provides softer shadows and shadow edges than a hard light.

Such parameters can be adjusted by the user using any of a variety of interface controls. For example, sliders can be displayed which allow the user to adjust a parameter value such as a brightness magnitude. Input fields can allow user to input numbers, words, or phrases. The direction of the emitted light can be manipulated by the user with a graphical element, e.g., a linear control that indicates the direction of the light and which can be rotated and moved by the user. The size and shape of illuminated areas can be adjusted graphically, where the user can drag control points on the area to adjust size and shape, or can use other tools or inputs. In some implementations, one or more of the parameters can be displayed alongside the light source element in the user interface, e.g., as values, sliders, arrows, outlines of affected areas, etc. Some examples of such interface elements are described below with reference to FIGS. 5 and 6.

In block 310, the method prepares the image to enhance the desired at illumination effect. This preparation can be overall image modifications that can enable a more effective illumination effect. For example, the method can reverse a gamma correction of the image. This can be performed to allow the method to adjust pixels of the image without the gamma correction applied, and after the adjustment the gamma correction can again be applied to the image including the newly-added illumination effect. In some cases, the gamma correction g that was applied is known, e.g., the method has access to a gamma correction operation that was applied to the image by the system performing method 300 or a related system, and this can be reversed by applying a gamma of 1/g. In other cases, if the gamma correction is not known, then a default gamma correction value can be assumed to have been applied, e.g., a gamma correction of 2.0.

In some implementations, block 310 preparation can also include darkening the image, e.g., lowering the brightness of the image. For example, an added illumination effect can be much more visible in a darkened image than in an image that has not been darkened. In some implementations, the method can darken the image automatically, e.g., by lowering or dimming the overall brightness a predetermined amount, or lowering by a brightness amount based on the current average brightness of the image or some other brightness measure of the image. Various implementations can darken the image by lowering brightness of each pixel without looking a neighboring pixels, and other implementations can darken a pixel based on color values of neighboring pixels. Some implementations can recommend a particular darkening amount to the user, who can then confirm the amount or change the amount to a user-specified value. Or, the user can be given an option to disallow the darkening operation completely.

In block 312, the method checks whether to use a refined illumination effect or a more basic illumination effect. For example, a basic illumination effect can adjust pixels of the image without regard to the content of the image, while a refined effect may take image content into account. In some cases, the basic illumination effect may not look as realistic as the refined effect for a variety of reasons. For example, such reasons can include lack of reflections and/or shadows which would have been present if the simulated light source had actually been present at the scene captured by the image as an actual light source, e.g., caused by physical surfaces of objects at the physical scene, some of which are captured in the content of the image as depicted surfaces. For a refined effect, method 300 can examine the content of the image and provide a refined illumination effect which may provide more realism and/or effectiveness in the illumination effect caused by the simulated light source.

In some implementations, the method can make one or more checks in block 314 related to the image to determine whether refinement is needed for the image. For example, the method can check whether an added simulated light source is tilted or angled, e.g., whether the light is entering the image slightly or strongly from one side of the image. Such light can cause more noticeable shadows and reflections which may not be (yet) present in the illuminated effect. In some examples, this condition can be checked by determining whether the light source element provides illumination in the image more strongly on one side of a vertical axis of the image than the other side. The vertical axis can be any approximately vertical axis of the image, e.g., based on the vertical borders of the image. In other implementations, such checks can be used at other blocks in method 300 and/or 400, e.g., to determine whether images without detected faces (as detected in FIG. 4) should use a refined illumination effect.

In some implementations, the use of a basic illumination effect or refined illumination effect can be made an option or choice that is presented to or directed by the user. For example, the user can have user preferences or settings that control which type of illumination effect is to be applied to the image (e.g., basic or refined), or the user can be prompted to select which type of illumination effect to apply. The method can also present the user with more detailed options governing the application of an illumination effect (e.g., which heuristics or blocks to use as described in FIG. 4, etc.). In some implementations, the basic illumination effect can first be added to a displayed image, e.g., in a preview image displayed to the user, where effect is provide similarly as in blocks 314 and 320-324 described below. If the user is more satisfied with the displayed appearance of the basic illumination effect than the refined illumination effect, then the user indicates this and no refined illumination effect is determined. Otherwise, the user selects that the refined effect be used on the image. In some implementations, the method 300 can perform both a basic illumination effect and a refined illumination effect, e.g., shown in different, side-by-side preview images, and the user can then select the desired image, e.g., which illumination effect is to be kept and which effect is to be discarded.

If a basic illumination effect is to be provided, then in block 314, the method determines new values for particular pixels of the image to create an illumination effect in the image caused by the simulated light source and based on the parameters of the light source element placed in block 306. The method examines the parameters of the light source element and determines new pixel values for pixels that will be affected by the simulated light source. For example, the method determines which pixels will be changed based on the direction of the light as provided by the light source element, and/or based on the size and shape of the area of the image to be affected as drawn or otherwise indicated by the light source element. The method determines the brightness pixel values for these pixels based on the brightness of parameter of the light source element and based on any other parameters affecting the brightness, such as "soft light" or "hard light" parameters. The method determines the color pixel values for these pixels based on any color related parameter of the light source element, such as color temperature. The method continues to block 320, described below.

If a refined illumination effect is to be provided, then in block 316, the method determines image content affecting the illumination emitted from the light source element(s). Herein, such "image content" can include objects depicted in the image and/or surfaces of objects depicted in the image. For example, the determined image content can include orientations of surfaces of objects (including various types of features, such as landscape or terrain) as depicted in the content which can affect the appearance of the illumination in the image based on the characteristics (direction, brightness, etc.) of the light. Some examples of determining image content affecting the illumination effect are described below with respect to FIG. 4.

In block 318, the method determines the pixel values for the illumination effect based on the image content determined in block 316. For example, in block 316 the method may have determined the location and orientation of surfaces depicted in the image within an approximate 3-D model constructed for the scene depicted in the image. Those surfaces are taken into account in block 318 when determining the appearance of the illumination effect. For example, the light emitted in the direction and/or angle specified by the light source element may cause the illumination effect to be reflected or scattered, or shadows to be present in a different way than determined in block 314, based on estimated in-image angles of estimated surfaces depicted in the image. Block 318 also uses the parameters of the light source element to govern the illumination effect similarly as in block 314.

In one example implementation, the method can multiply the illumination brightness at each appropriate determined in-image surface by a function that adjusts the brightness based on the surface angle with respect to the angle of the light. One example of such a function is a cosine function, e.g., $$\cos(\text{light source angle} - \text{estimated in-image surface angle})$$

where the light source angle and the estimated in-image surface angle are with respect to the camera plane reference (e.g., plane through which the camera sees and captured the image, the plane of a CCD sensor of a camera, etc.). In some implementations, this illumination brightness function can be applied to each pixel of each different surface angle located in the newly illuminated area of the image, or alternately can be applied to regions of similar pixels. In one example, if the surface angle is exactly perpendicular to the emitted light, then 100% of the brightness of the light is provided in the illuminated pixels at that surface. If the surface angle is parallel to the emitted light, 0% of the brightness is provided for the pixels at that surface, e.g., the brightness is adjusted down to 0 for those pixels so that there is no illumination at that surface. This is because the light is not reflected at all from that surface and a camera would not detect it in the view angle of the image. Other functions can be used in other implementations.

In block 320, the method writes the determined pixel values to the appropriate pixels of the image to provide the illumination effect in the image. For example, pertinent pixels in the original image are adjusted to provide the illumination effect in a modified image. In some implementations, a stored original version of the image is modified, while in other implementations, a duplicate of the original image is created with the modified pixels such that the original image is preserved. For example, in some implementations the area of illumination as indicated by the light source elements is increased in brightness and changed in color and/or other parameters as indicated by the light source element parameters. In addition, in some implementations, an area outside of the illuminated area can start at the increased brightness (and changed other parameters) at the edge of the illuminated area and decrease in brightness away from the illuminated area until the standard brightness (and other pixel values) are attained. This decreasing brightness can be provided in an outside zone defined by the light source element (e.g., as shown in an example for FIG. 6), or can be estimated by the system. The decreasing brightness can be decreased according to predetermined functions in some implementations, e.g., a Gaussian function. In other implementations, the brightness is increased according to a predetermined function starting from the non-illuminated edge of the illuminated area toward the center of the illuminated area.

In block 322, the method re-applies the gamma correction that was removed in block 310 (if applicable), so that the image is gamma corrected including the added illumination effect. In block 324, the method causes the display of the modified image that includes the illumination effect. In some implementations, this display can be a display of a preview image for viewing by the user, where the preview image is not kept in longer-term storage unless the user elects to keep the modified image. Some implementations can display changes made to the image during any of the blocks of FIG. 3.

Figure 4:
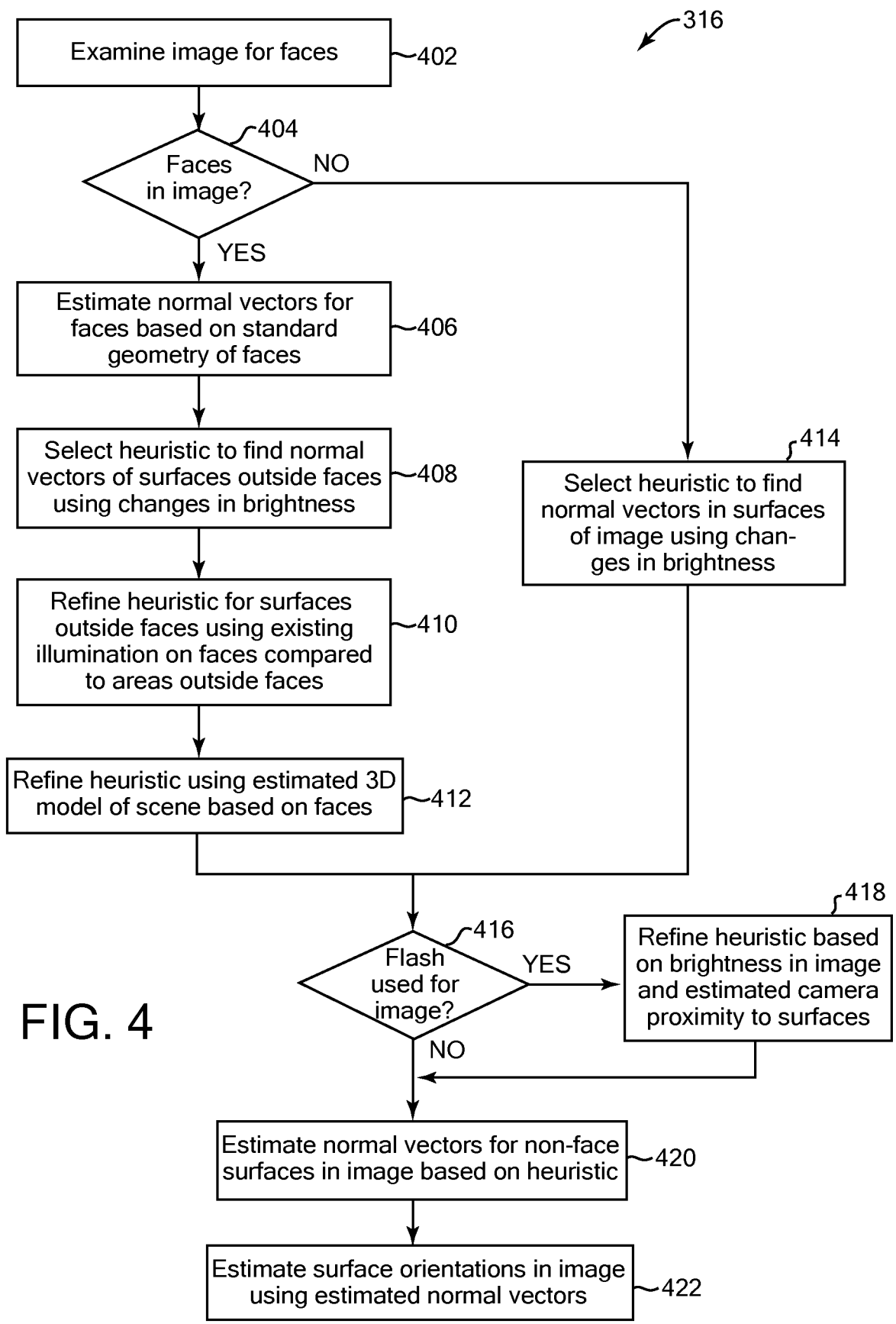
FIG. 4 is a flow diagram illustrating an example method for determining image content that can affect illumination from a simulated light source, according to some implementations.

FIG. 4 is a flow diagram illustrating an example method 400 implementing block 316 of FIG. 3, in which the method determines image content and object surface orientations in an image which can affect an illumination effect from a simulated light source, according to some implementations.

In block 402, the method examines the image to attempt to detect one or more faces (and/or other types of objects) depicted in the image. Any of a variety of techniques can be used to detect faces and other types of objects. For example, faces can be detected using facial recognition and detection techniques, e.g., techniques that look for facial landmarks such as eyes, eyebrows, nose, mouth, etc. The identity of face (e.g., a depicted person's name based on a recognized face) need not be determined, e.g., just detection of faces. In other implementations, an identity can be determined if associated depth map and/or other 3-D information can be retrieved for that face. In some implementations, object recognition, geographic landmark recognition, landscape feature recognition (e.g., trees, buildings, clouds, etc.), article recognition (physical items, etc.) and other types of object detection techniques can be used to detect a variety of other types of depicted objects.

In block 404, the method checks whether one or more faces (e.g., human faces, or animal faces in other implementations) were detected in the image. If not, the method continues to block 414, described below. If one or more faces were detected, then in block 406 the method estimates normal vectors for surfaces of the faces based on standard geometry of a face. For example, once the method identifies facial landmarks in a face, then normal vectors for the surfaces of the face can be estimated using a standard or typical face surface template that has typical facial 3-D geometry, and which can be adapted to the size and spacing of the particular face and its facial landmarks. In one example, a known standard depth-mask for a general person can be adapted or fitted to the particular spacing of the facial landmarks of a face in the image. The depth mask provides the image "depths," e.g., distances from the camera to the face surface pixels, and from this depth information the method can determine the normal vectors (e.g., orientations or angles) of the surfaces of the face.

A normal vector as referred to herein is a vector extending perpendicularly from the plane of a surface in a direction toward the exterior space to the surface (e.g., typically having a component in a direction toward the camera). A "local" normal vector pertains to a vector at single point on a surface. In some cases, the point on the surface can be a pixel, so that there is a local normal vector at each pixel. In other cases, local normal vectors can be positioned at points on the face that may not correspond to every pixel of the face, e.g., describing less detail than a vector at every pixel. For example, a blur or bilateral filter can be first applied to the face and then local normal vectors found by examining changes in brightness (e.g., similar to block 408, described below).

The method can analyze the standard depth map of the face to determine the local normal vector at each point of the face (e.g., at each pixel or other point), where the local normal vectors indicate surface orientations or surface angles on the face with respect to the camera plane (e.g., the vertical plane through which the camera views the scene). The local normal vectors can be integrated to determine the orientations of the surfaces of each face in the image, as described below in block 424. In some implementations, other techniques or heuristics can be used to find normal vectors of facial surfaces, e.g., the heuristic of block 408 described to find normal vectors of non-facial objects and surfaces using changes in brightness can be used for finding the local normal vectors for faces.

In block 408, the method selects a technique or heuristic to find normal vectors of surfaces that are located outside the faces in the image, where the heuristic examines changes in existing brightness in the image. For example, a changing image depth (e.g., distance from camera to estimated surface) over a particular area can be used to indicate the normal vectors, where the changing image depth is based on a brightness gradient over that area. In one example of the heuristic, the method can examine the image in a particular direction (e.g., left to right), and check for a change in brightness over a particular span of pixels. For example, the method can perform a derivative of the brightness values of pixels in that direction over a particular span of pixels. If there is a change of an increasing brightness (luminance) in the pixels in the direction of scan (e.g., the resulting derivative is positive), this indicates a decrease in depth to the camera and a left-pointing surface (and normal vector) from the point of view of the camera. If there is a change of a decreasing brightness in the pixels in the direction of the scan (e.g., the resulting derivative is negative), this indicates an increase in the depth and a right-pointing surface. For example, in a front-facing portrait of a face, the left cheek would point left, and the right cheek would point right. Based on such results and indications of surface direction, the method can estimate local normal vectors at points in these brightness gradients (e.g., at points at the center of a span of pixels in which the brightness changes in one direction, and/or at the endpoints of such a span). The local normal vectors are used to obtain the orientations of the estimated surfaces in these areas (e.g., as in block 422 below).

In block 410, the method can optionally refine the heuristic selected to find normal vectors in areas outside face in block 408, where the refining includes using existing illumination in the original image on one or more faces compared to the areas outside the face. For example, if the relation between surface illumination and 3-D geometry is known or estimated for the face (e.g., based on a standard face-depth mask), that relation may be able to be used to derive a better heuristic for areas of the image outside the face. In one example, if an existing reflection of light is shown in the image for a surface on a face, and a similar reflection is shown on an object outside the face, then the method can surmise that the surface outside the face is positioned at a similar depth to the known surface on the face and is oriented in a similar direction. Multiple surfaces in the image can be examined and their normal vectors found (in block 420) based on existing illumination similarities to face surfaces.

In block 412, the method can optionally refine the selected heuristic using an estimate of a 3-D model of the scene depicted in the image and based on one or more faces in the image. For example, the 3-D model of the image scene can be very coarse in its estimation of different distances of various objects to the camera (depths) and/or to each other and the surfaces resulting from those distances. In one example, the method can examine image objects and roughly position those objects in a 3-D model of the scene based on a heuristic providing that objects next to a face are typically further away from the camera than the face itself, and so can position the objects with a greater depth from the camera. In another example, if multiple faces are detected in the image, the method can compare the sizes of the faces to determine an estimate of the distances of the faces to the camera, since smaller faces are further away from the camera. In addition, the method can surmise that an object appearing between two faces is likely to be further back than any of the faces, and place that object further away accordingly in the 3-D model. Using such heuristics can help the method determine the estimated, approximate 3-D model that can indicate approximate distances between object surfaces and to the camera and the normal vectors of those surfaces. These distances can be used to refine the heuristic selected in block 408 for estimation of normal vectors for depicted surfaces. The method then continues to block 416, described below.

In some implementations, additional data can be available with allows a more accurate 3-D model to be determined. For example, metadata associated with the image can include such additional data. In some implementations, the camera capturing the image includes a depth sensing capability that measures distances from the camera to different areas of the image or to pixels of the image. For example, an infrared camera, 3-D camera, stereo camera, structured light camera, time-of-flight camera, or other type of depth-sensing camera (using visible and/or non-visible light) can be used. A depth map image can be captured simultaneously with the capture of the visual image of the scene, for example. Such more-detailed depth information can allow a more accurate 3-D model of the image scene to be constructed, which in turn allows the method to more accurately determine normal vectors of object surfaces in the image (and consequently determine a refined and more realistic illumination effect in FIG. 3).

If there are not faces detected in the image in block 404, then the method continues to block 414 in which the method selects a technique or heuristic to find normal vectors in surfaces of the image using changes in brightness. Since there were no faces detected in the image, the method can select the heuristic described above with reference to block 408 used to find normal vectors outside of faces. However, since no faces were detected in the image, the face-based refinements to the heuristic described in blocks 410 and 412 would not be generally available. The method then continues to block 416.

In block 416, the method checks whether a flash (or other similar additional directed light) was used to illuminate the scene when the image was captured. In some implementations, the use of a flash is known from metadata associated with the image, e.g., an indication of flash use that is stored as metadata to the image by the camera when the picture is taken. In some cases, the method can look for telltale signs of flash use in the pixels and depicted objects of the image to determine whether a flash was used, such as a very bright reflection, red-eye on eyes of faces, etc.

If no flash was used, the method continues to block 420, described below. If a flash was used, then in block 418 the method refines the heuristic used for determining normal vectors outside faces based on the brightness in the image and correlated camera proximity to surfaces in the image. In some examples, if the method knows that the image has been captured with a flash (e.g. by examining metadata or looking for telltale signs in the image content), the brightness of particular surfaces in the image can indicate a correlated camera proximity to those surfaces, thus providing more data about the image depths of those surfaces (distance from camera to surface). For example, the method can compare the brightness of a surface in the image with known brightnesses and image depths corresponding to those brightnesses when the flash was used. Furthermore, the heuristic selected above in blocks 408 and 414 can function more accurately if the light from the flash originated close to the camera, e.g., the method can assign a greater confidence to the normal vectors determined with that heuristic since it detected a flash effect indicating those camera and flash positions. The method then continues to block 420.

In block 420, the method estimates normal vectors for non-face surfaces in the image based on the selected heuristic that examines changes in brightness, as further enhanced by any refinements described above in blocks 410, 412, and 418. For example, using the heuristic, the method can examine image pixels in a particular direction (e.g., left to right), and perform a derivative of the brightness values of pixels in that direction over a particular area to find a left-pointing or right-pointing normal vector for each point as described above. Based on such results and indications of surface direction, the method can estimate local normal vectors for the points of the estimated surfaces in the image. In some implementations, the method can scan a set of pixels that belong to an object detected in block 402 and determine the normal vectors for that object, then scan pixels included in another detected object, etc. In some implementations, the heuristic may be especially effective to find the depths and normal vectors of surfaces of approximately spherical objects depicted in the image.

In block 422, the method estimates the surface orientations (angles) in the image using the normal vectors estimated in the above blocks. For example, a surface can be determined by integrating the estimated local normal vectors of a number of adjacent pixels. The surface orientations can be with respect to the camera plane, in some implementations. The method then returns to block 318 of FIG. 3 to determine the illumination effect for the image using the estimated surface orientations in the image determined in block 422.

Various blocks and operations of methods 200-400 can be performed in a different order than shown and/or at least partially simultaneously, where appropriate. For example, some implementations can perform blocks of the methods at various times and/or based on events not related to a user editing an image. In some implementations, blocks or operations of methods 200-400 can occur multiple times, in a different order, and/or at different times in the methods. In some implementations, the methods 200, 300, and/or 400 can be implemented, for example, on a server system 102 as shown in FIG. 1. In some implementations, one or more client devices can perform one or more blocks instead of or in addition to a server system performing those blocks.

Figure 5:
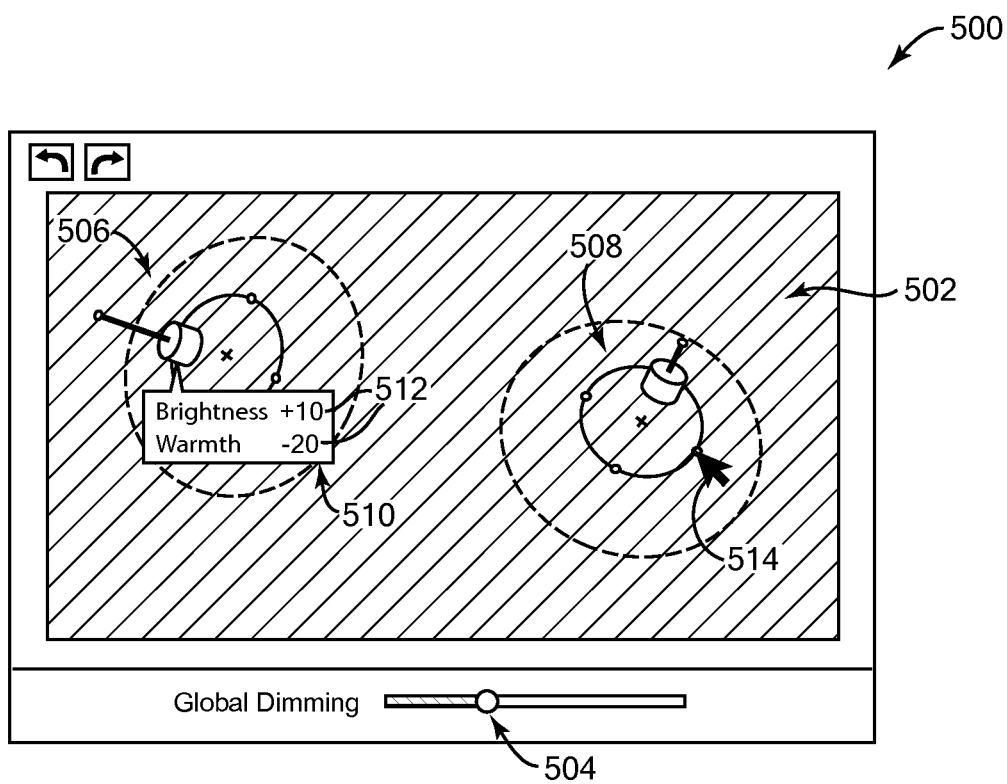
FIGS. 5-6 are diagrammatic illustrations of example user interface elements using one or more described features.

FIG. 5 is a diagrammatic illustration of an example of a user interface 500 of an image editing program that can use one or more features described herein. User interface 500 can be displayed by a display device of a system implementing method 200 or 300, in some examples.

In some examples, user interface 500 can be displayed by an image editing program that provides image editing functions for a user. For example, the user can open an image 502 (indicated by hatch lines in FIG. 5) that is displayed by the image editing program in the user interface. Alternatively, the image 502 can be opened in interface 500 by a program.

The user interface allows the user to select various functions to manipulate the characteristics of the image. In this example, various interface elements are shown that can be used for or with a lighting tool that allows a user to add and/or adjust simulated light sources and corresponding illumination to the image. For example, a global dimming control 504 can allow a user to reduce the overall brightness of the image 502 by a desired amount based on the position of a slider, e.g., to allow an added illumination effect to be more visible than if no darkening were added. For example, the user can dim the image 502 before light source elements are added to the image. In other implementations, such darkening can be selected using other types of controls, or the system can suggest a darkening amount for the image.

The user interface 500 also includes two light source elements 506 and 508 in this example, which are superimposed over the image 502. Fewer or additional light source elements can be provided for an image in other examples. The light source elements 506 and 508 are user interface elements and are not part of the image 502, and have been positioned over particular locations of the image to add a simulated light source with reference to those locations, where each light source element adds an associated illumination effect to the image.

Light source element 506 is positioned over one area of the image and provides an illumination effect at its location. Element 506 has been selected by the user to display two of its parameters in display box 510, which in this example are brightness and warmth. The current parameter values 512 for these parameters are also displayed. In some implementations, the user can select the values 512 and change them to desired values, e.g., via keyboard input, slider input, touch input, etc. The illumination effect associated with the light source element 506 has a brightness and warmth based on the values 512.

Light source element 508 is positioned over a different area of the image 502 than element 506 and provides its own illumination effect at its location. A user-controlled cursor 514 is shown selecting a control point of the light source element 508 (described below) and dragging the control point to a position directed by the user. Cursor 514 can be controlled by the user using a pointing device (e.g., mouse, stylus, trackball, trackpad, etc.) to be moved over the desired area of the image or control to allow selection and/or manipulation by the user. In other implementations, the user interface 500 can be displayed by a touchscreen that can sense user contact with the screen. For example, the user can select and/or manipulate a control or image portion by contacting a finger, stylus, or other object on the touchscreen at a location corresponding to the desired location of the user interface or image, and a cursor 514 need not be displayed. User selections and manipulation can also or alternatively be made using voice commands, visible commands sensed by the system, motion commands, etc.

Figure 6:
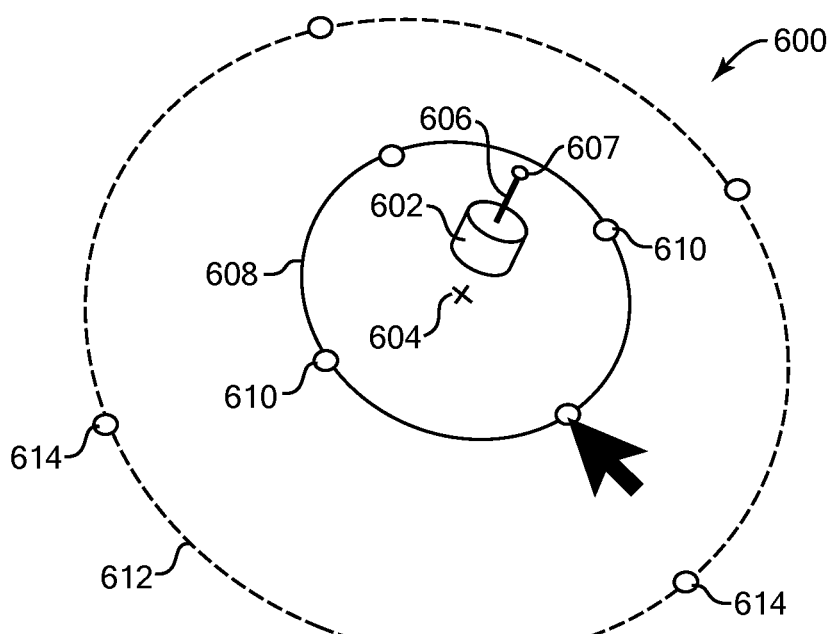

FIG. 6 is a diagrammatic illustration of an example light source element 600 that can be used for light source elements 506 and 508 shown in FIG. 5. An element core 602 provides a reference or basis for the light produced by light source element 600, e.g., an object from which the simulated light can be emitted. In the example shown, the core 602 is a cylindrically shaped icon that is displayed as if viewed from a side angle. In some implementations, the core 602 can be displayed as if it is a 3-D object oriented in the direction of the simulated light provided by the element 602, e.g., to provide the user a visual indication of that direction. A cross 604 (or other target indicator or mark) can be displayed in line with the center axis of the core 602 and marks the center of the illuminated area that is provided on the "surface" of the illuminated image by the simulated light.

Light source element 600 can also include a direction control 606 that allows the user to manipulate the direction of the light provided by the simulated light source of the element 600. In the example shown, the direction control 606 is displayed as a linear tool or stick extending out the opposite side of core 602 from the cross 604, and having a control knob 607 at its end that the user can select and move as desired to change the orientation and tilt of the light source with respect to the image. In some implementations, the linear tool 606 and core 602 is rotated or moved with the control knob 607. Other implementations can provide different types of direction controls. In some implementations, the user can extend or contract the length of the linear tool 606 to control one or more associated parameters of the light control element, such as brightness, etc.

Light source element 600 can also include an illuminated area outline 608 that defines the particular size and shape of the illumination on the image. For example, pixels of the image that are inside the outline 608 are illuminated by the light source element (e.g., directly receiving the simulated light) based on the parameters of the light source element 600. The area outline 608 can be provided in different default shapes, such as circles and ellipses, or can provide other predefined or user-defined shapes. In this example, the user can adjust the size and/or shape of an existing outline 608 by selecting and moving one or more control points 610 positioned at different locations around the outline. For example, a user can select one of the control points 610 and move that point in a direction further from cross 604, which causes the outline 608 to stretch in shape toward that moved direction. Some implementations can allow a user to select one control point 610 and increase or decrease the size of the outline 608 without changing its shape. In addition, some implementations can allow the user to select a control point and move the entire outline 608 across the image to a different location, where the cross 604 follows the center of the outline. Implementations can also allow a user to add more control points on the outline 608, cause the outline 608 to have square or angular edges or corners, or change the outline 608 in other ways.

A dashed outline 612 can also be displayed in some implementations, e.g., outside the outline 608. Outline 612 can indicate an outer fall-away or drop-off zone for the illuminated area of outline 608, in which the light intensity gradually decreases according to a predetermined function (such as a Gaussian function, or other function) away from outline 608 until it reaches the outline 612, at which point the light intensity is at the same or similar brightness as the pixels not affected by the simulated illumination effect, e.g., at zero magnitude of the simulated added illumination. Some implementations can provide a light intensity at the outline 612 to be close to the 0 level for the added illumination, e.g., within 10%. In some implementations, outline 612 can include control points 614 similar to the control points 610 to allow the user to adjust the size and/or shape of outline 612. For example, a smaller diameter of outline 612 provides a smaller distance between outline 608 and dashed outline 612, causing the simulated light effect to have a harder/sharper boundary than a softer/fuzzier boundary provided by a longer distance between outlines 608 and 612.

Figure 7:
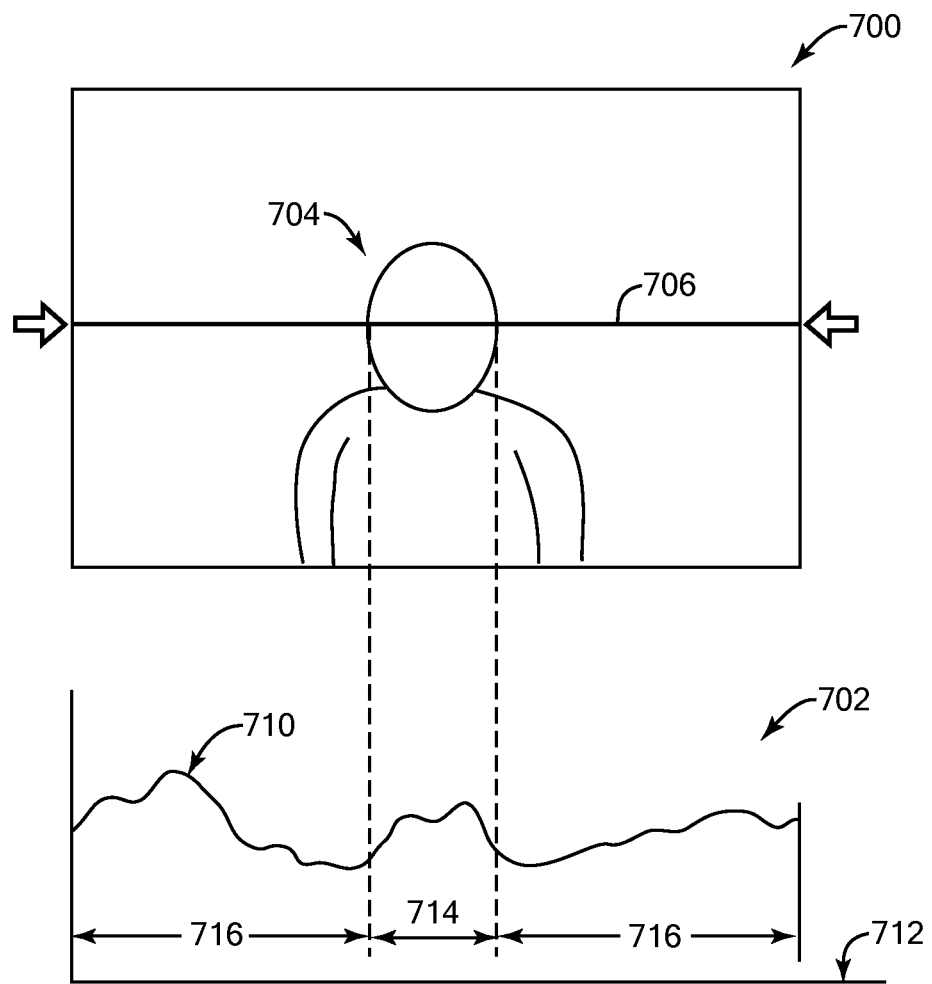
FIG. 7 is a diagrammatic illustration of showing an example image and depth map for objects depicted in the image.

FIG. 7 is a diagrammatic illustration showing an example image 700 and depth map 702 for objects depicted in the image. The depth map 702 can be determined by the system to describe depicted surfaces in the image for an illumination effect as described above.

Image 700 includes a depicted person 704 including a face. A line 706 is used to indicate the particular horizontal slice of image 700 to which the depth map 702 describes. Each different slice of the image 700 (e.g., each horizontal row of pixels) can be associated with its own depth map. Depth map 702 shows estimated depths in the image 700 to the pixels of the row 706, e.g., distances from the camera that captured the image 700 to a surface at a pixel in the image. A plotted curve 710 shows the depth at each point along the line 706 in the image 700. The higher the magnitude of the curve (e.g., away from the depth map horizontal axis 712), the closer or smaller is the distance from the camera to a surface depicted at that point in the image. In some example implementations, a common value for the highest point in the curve (and thus closest surface to the camera) can be about 20 inches, and the lowest point in the curve (farthest surface from the camera) can be about 5 yards. These distances can be different in other implementations and examples.

A central section 714 of the curve 710 corresponds to the depths of the face of the depicted person 704. The image depths at these points of the image can be derived from the face, e.g., by detecting facial landmarks of the face (eyes, nose, mouth, etc.) and adapting a known standard facial depth-mask to those facial landmarks. Sections 716 of the curve 710 correspond to surfaces located at the sides of the depicted person 704 in image 700, and surfaces in these sections 716 can be estimated based on techniques described above with reference to FIG. 4 (the depicted non-face surfaces are not shown in FIG. 7). For example, normal vectors and surfaces can be estimated from image gradients such that if the image has ascending brightness values from left to right, a decrease in the distance to the camera is assumed, and if the image has descending brightness values, an increase in the distance to the camera is assumed. The effect of the estimated surfaces on the illumination in the image can be determined as described above.

Figure 8:
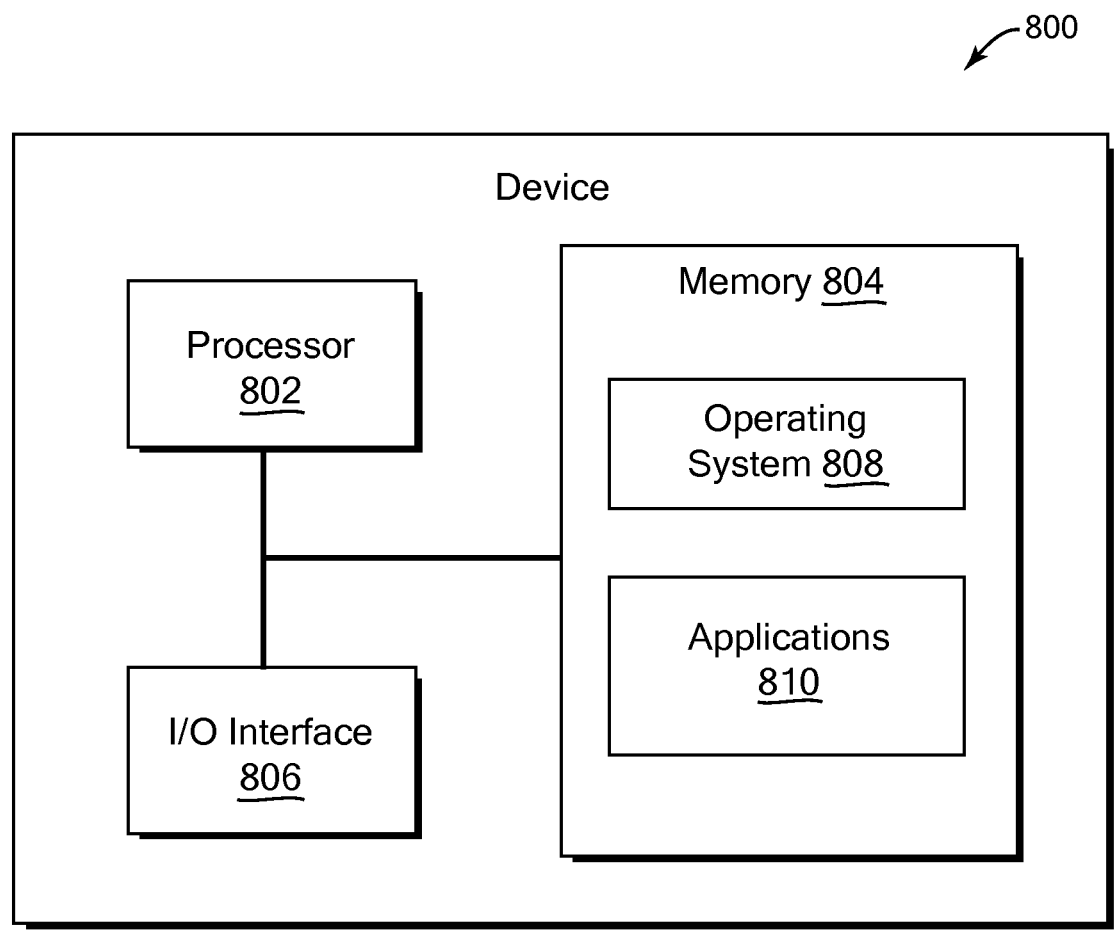
FIG. 8 is a block diagram of an example device which may be used for one or more implementations described herein.

FIG. 8 is a block diagram of an example device 800 which may be used to implement one or more features described herein. In one example, device 800 may be used to implement server device 104 of FIG. 1, and perform appropriate method implementations described herein. Device 800 can be any suitable computer system, server, or other electronic or hardware device. For example, the device 800 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 800 includes a processor 802, a memory 804, and input/output (I/O) interface 806.

Processor 802 can be one or more processors or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the device 800 by the processor 802, including an operating system 808 and one or more applications engines 810 such as an image editing and/or processing engine, web hosting engine, social networking engine, etc. In some implementations, the applications engines 810 can include instructions that enable processor 802 to perform the functions described herein, e.g., some or all of the methods of FIGS. 2-3. Any of software in memory 804 can alternatively be stored on any other suitable storage location or computer-readable medium. In addition, memory 804 (and/or other connected storage device(s)) can store images (original and modified), parameters and locations of light source elements with reference to particular images, and other data used in the features described herein. Memory 804 and any other type of storage (magnetic disk, optical disk, magnetic tape, or other tangible media) can be considered "storage devices."

I/O interface 806 can provide functions to enable interfacing the device 800 with other systems and devices. For example, network communication devices, storage devices such as memory and/or database 106, and input/output devices can communicate via interface 806. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 800, such as processor(s) 802, memory 804, and I/O interface 806. An operating system, software and applications suitable for the client device can be provided in memory and used by the processor, such as an image editing program, client communication application software, etc. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images, interfaces, and other data as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method comprising:
receiving input indicating a location on a displayed two-dimensional (2-D) image at which to position a light source element that provides a simulated light source; and
adjusting pixel values of the image to cause an illumination effect in the image based on the position of the light source element and based on an angle of illumination of the simulated light source with respect to one or more surfaces depicted in the image,
wherein adjusting pixel values includes determining an estimated three-dimensional (3-D) model of a scene depicted in the image, wherein determining the estimated 3-D model includes estimating depths into the scene of one or more non-face objects depicted in the image based on locations of one or more faces depicted in the image compared to locations of the one or more non-face objects depicted in the image, wherein particular non-face objects of the one or more non-face objects that are adjacent to the one or more faces are designated to have a greater depth into the scene than the one or more faces adjacent to the particular non-face objects.

2. The method of claim 1 wherein adjusting the pixel values further includes determining one or more surface angles of the one or more surfaces depicted in the image by estimating local normal vectors for the one or more surfaces.

3. The method of claim 2 wherein estimating the local normal vectors for the one or more surfaces includes using one or more of the depths into the scene of the one or more non-face objects.

4. The method of claim 2 wherein determining the one or more surface angles is based on a predefined map of face surfaces adapted to the one or more faces depicted in the image.

5. The method of claim 2 further comprising adapting a size and a shape of a predefined map of face surfaces to the one or more faces depicted in the image, wherein the estimating the local normal vectors for the one or more surfaces includes estimating the local normal vectors for surfaces of the one or more faces based on the predefined map adapted to the one or more faces depicted in the image.

6. The method of claim 5 wherein the predefined map is a standard map of face surfaces.

7. The method of claim 1 wherein adjusting pixel values further includes determining image depth from a camera that captured the image to one or more objects depicted in the image based on a brightness of one or more object surfaces of the one or more objects.

8. The method of claim 7 wherein the brightness of the one or more object surfaces is caused by a flash in effect when the image was captured.

9. A computer-implemented method comprising:
receiving input indicating a location on a displayed two-dimensional (2-D) image at which to position a light source element that provides a simulated light source;
adjusting pixel values of the image to cause an illumination effect in the image based on the position of the light source element and based on an angle of illumination of the simulated light source with respect to one or more surfaces depicted in the image, wherein adjusting the pixel values includes determining one or more surface angles of the one or more surfaces depicted in the image; and
adapting a size and a spacing of a predefined map of face surfaces to one or more faces depicted in the image, wherein determining the one or more surface angles is based on the predefined map of face surfaces adapted to the one or more faces depicted in the image.

10. The method of claim 9 wherein adapting the size and the spacing of the predefined map of face surfaces to the one or more faces depicted in the image includes adapting the spacing of the predefined map of face surfaces to facial landmarks of the one or more faces.

11. The method of claim 9 wherein the one or more surface angles are determined by estimating local normal vectors for the one or more surfaces.

12. The method of claim 11 wherein estimating the local normal vectors for the one or more surfaces includes estimating the local normal vectors for one or more surfaces of human faces based on the predefined map of face surfaces adapted to the one or more faces depicted in the image.

13. The method of claim 12 wherein the predefined map is a standard map of face surfaces.

14. The method of claim 11 wherein adjusting pixel values includes determining an estimated three-dimensional (3-D) model of a scene depicted in the image, wherein determining the estimated 3-D model includes estimating depths into the scene of one or more non-face objects depicted in the image based on locations of the one or more faces depicted in the image compared to locations of the one or more non-face objects depicted in the image, wherein particular non-face objects of the one or more non-face objects that are adjacent to the one or more faces are designated to have a greater depth into the scene than the one or more faces adjacent to the particular non-face objects,
wherein estimating the local normal vectors for the one or more surfaces includes using one or more of the depths into the scene of the one or more non-face objects.

15. The method of claim 9 wherein adjusting the pixel values of the image further includes estimating the one or more surfaces depicted in the image based on analysis of image pixels of the image without reference to data describing three-dimensional (3-D) features of a scene depicted by the image.

16. A system comprising:
a storage device storing a two-dimensional (2-D) image; and
at least one processor accessing the storage device and configured to perform operations comprising:
causing the image to be displayed on a display device;

receiving input indicating a location on a displayed image at which to position a light source element that provides a simulated light source;

adjusting pixel values of the image to cause an illumination effect in the image based on the position of the light source element and based on an angle of illumination of the simulated light source with respect to one or more surfaces depicted in the image, wherein adjusting the pixel values includes determining one or more surface angles of the one or more surfaces depicted in the image; and adapting a size and a spacing of a predefined map of face surfaces to one or more faces depicted in the image, wherein determining the one or more surface angles is based on the predefined map of face surfaces adapted to the one or more faces depicted in the image.

17. The system of claim 16 wherein the operation of adapting the size and the spacing of the predefined map of face surfaces to the one or more faces depicted in the image includes adapting the spacing of the predefined map of face surfaces to facial landmarks of the one or more faces.

18. The system of claim 16 the one or more surface angles are determined by the at least one processor performing operations including estimating local normal vectors for the one or more surfaces.

19. The system of claim 18 wherein the operation of estimating the local normal vectors for the one or more surfaces includes estimating the local normal vectors for one or more surfaces of human faces based on the predefined map of face surfaces adapted to the one or more faces depicted in the image.

20. The system of claim 18 wherein the operation of adjusting pixel values includes determining an estimated three-dimensional (3-D) model of a scene depicted in the image, wherein determining the estimated 3-D model includes estimating depths into the scene of one or more non-face objects depicted in the image based on locations of the one or more faces depicted in the image compared to locations of the one or more non-face objects depicted in the image, wherein particular non-face objects of the one or more non-face objects that are adjacent to the one or more faces are designated to have a greater depth into the scene than the one or more faces adjacent to the particular non-face objects, wherein estimating the local normal vectors for the one or more surfaces includes using one or more of the depths into the scene of the one or more non-face objects.

* * * * *